BEST AVAILABLE COPY

T857-044

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 24, 1968

857 O.G. 1039

657,493

TERNARY RUBBER BLEND COMPRISING E.P.D. HALOBUTYL, AND HIGHLY UNSATURATED RUBBERS

Lewis T. Ladocsi, 437 Hobart Ave., Short Hills, N.J. 07078, and Donald G. Young, 254 Midway Ave., Fanwood, N.J. 07023

Filed Aug. 1, 1967. Published Dec. 24, 1968

Class 260—5

No Drawing. 3 Pages Specification

A three-part blend of ethylene-propylene terpolymer, halobutyl rubber, and a high unsaturation rubber, has surprisingly improved physical properties after vulcanization. More specifically, the blend is composed of 15–30 wt. percent of a terpolymer of ethylene, and a higher alpha olefin such as propylene, along with a small amount of a nonconjugated diolefin, such as 5-methylene-2-norbornene; with 25–30 wt. percent of a halobutyl rubber, such as chlorobutyl; and 40–70 wt. percent of a high unsaturation rubber, such as polybutadiene or natural rubber. The amount of high unsaturation rubber used will depend upon how much of the other two components are put into the blend, the amount of high unsaturation rubber being, in essence, that amount which is necessary to complete a 100% mixture of total rubber.

These blends, after vulcanization, have surprisingly improved static ozone and heat-flex resistance, particularly when compared with terpolymer/high unsaturation rubber blends. In addition, these blends retain the high static ozone resistance and good physical property characteristics of binary blends of terpolymer and high unsaturation rubber. Conventional fillers, such as carbon blacks, oils, etc. can be used in the blends, and they are vulcanizable with curing agents which are conventional for high unsaturation or chlorobutyl rubbers. These include sulfur, alkylphenol disulfide, zinc oxide and guanidines.